United States Patent
Yamada

(10) Patent No.: US 10,958,450 B1
(45) Date of Patent: *Mar. 23, 2021

(54) CONSTRUCTING A MULTIPLE-ENTITY ROOT CERTIFICATE DATA BLOCK CHAIN

(71) Applicant: ISARA Corporation, Waterloo (CA)

(72) Inventor: Atsushi Yamada, Toronto (CA)

(73) Assignee: ISARA Corporation, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/071,451

(22) Filed: Oct. 15, 2020

(51) Int. Cl.
  *H04L 29/06* (2006.01)
  *H04L 9/32* (2006.01)
  *H04L 9/06* (2006.01)

(52) U.S. Cl.
  CPC .......... *H04L 9/3268* (2013.01); *H04L 9/0637* (2013.01); *H04L 9/0643* (2013.01); *H04L 9/3247* (2013.01); *H04L 2209/38* (2013.01)

(58) Field of Classification Search
  CPC ... H04L 9/3268; H04L 9/0637; H04L 9/0643; H04L 9/3247; H04L 2209/38
  See application file for complete search history.

(56) References Cited

U.S. PATENT DOCUMENTS

| | | |
|---|---|---|
| 5,214,702 A | 5/1993 | Fischer |
| 5,610,982 A | 3/1997 | Micali |
| 6,134,327 A | 10/2000 | Van Oorschot |
| 6,553,493 B1 | 4/2003 | Okumura et al. |
| 9,660,978 B1 | 5/2017 | Truskovsky et al. |
| 9,794,249 B1 | 10/2017 | Truskovsky et al. |
| 9,882,918 B1 | 1/2018 | Ford et al. |
| 2004/0193872 A1 | 9/2004 | Saarepera et al. |
| 2016/0292680 A1 | 10/2016 | Wilson et al. |
| 2017/0046651 A1 | 2/2017 | Lin et al. |

(Continued)

FOREIGN PATENT DOCUMENTS

| | | |
|---|---|---|
| CN | 106301792 | 1/2017 |
| CN | 106789041 | 5/2017 |
| CN | 107070644 | 8/2017 |

OTHER PUBLICATIONS

USPTO, Non-Final Office Action dated Feb. 27, 2020, in U.S. Appl. No. 16/380,548.

(Continued)

*Primary Examiner* — Ghodrat Jamshidi
(74) *Attorney, Agent, or Firm* — Henry Patent Law Firm PLLC

(57) ABSTRACT

In a general aspect, a multiple-entity root certificate data block chain is constructed and maintained for use in a cryptography system. In some aspects, a genesis data block includes genesis block data entries representing respective member entities of a root certificate authority consortium. A block chain comprising the genesis block is provided for use by one or more end entities as a root certificate data block chain in a cryptography system. In some aspects, an action data block comprising an action block data entry is generated and sent to member entities of the root certificate authority consortium. An action block based on the action data block is generated and associated with an existing block of the block chain. The block chain comprising the action block is providing for use, by one or more end entities, as a root certificate data block chain in the cryptography system.

26 Claims, 17 Drawing Sheets

(56) References Cited

U.S. PATENT DOCUMENTS

| | | | |
|---|---|---|---|
| 2017/0250827 A1 | 8/2017 | Opschroef et al. | |
| 2018/0115416 A1* | 4/2018 | Diehl | H04L 9/0838 |
| 2018/0227275 A1* | 8/2018 | Russinovich | H04L 9/3265 |
| 2018/0260212 A1* | 9/2018 | Wisnovsky | G06F 8/71 |
| 2018/0343126 A1* | 11/2018 | Fallah | H04L 9/006 |
| 2019/0012249 A1 | 1/2019 | Mercuri et al. | |
| 2019/0036711 A1 | 1/2019 | Qiu | |
| 2019/0199535 A1* | 6/2019 | Falk | H04L 9/0643 |
| 2019/0205873 A1* | 7/2019 | Kamalsky | H04L 63/12 |
| 2019/0207781 A1* | 7/2019 | Harpur | H04L 9/3239 |
| 2019/0317924 A1 | 10/2019 | Alimi et al. | |
| 2019/0372777 A1* | 12/2019 | Choi | H04L 9/3247 |
| 2020/0084194 A1* | 3/2020 | McMurdie | G06Q 20/065 |
| 2020/0145234 A1* | 5/2020 | Nishijima | H04L 9/0891 |
| 2020/0244464 A1* | 7/2020 | McLean | H04L 9/3247 |
| 2020/0334685 A1* | 10/2020 | Yan | G06Q 20/363 |

OTHER PUBLICATIONS

WIPO, International Search Report and Written Opinion dated Jun. 25, 2019, in PCT/CA2019/050443, 16 pgs.

USPTO, Non-Final Office Action dated Jul. 18, 2019, in U.S. Appl. No. 16/380,548, 18 pgs.

USPTO, Final Office Action dated Aug. 28, 2020, in U.S. Appl. No. 16/380,548, 23 pgs.

"Certificate Transparency", https://www.certificate-transparency.org, Mar. 1, 2018, 2 pgs.

"Namecoin", https://en.wikipedia.org/w/index.php?title=Namecoin&oldid=834457487, Mar. 19, 2018, 4 pgs.

"Pretty Good Privacy", https://en.wikipedia.org/wiki/Pretty_Good_Privacy, Mar. 29, 2018, 10 pgs.

"Public key infrastructure", https://en.wikipedia.org/wiki/Public_key_infrastructure, Dec. 27, 2017, 6 pgs.

"The difference between a Private, Public & Consortium Blockchain", https://www.blockchaindailynews.com/The-difference-between-a-Private-Public-Consortium-Blockchain_a24681.html, Nov. 14, 2017, 6 pgs.

"Web of trust", https://en.wikipedia.org/wiki/Web_of_trust, Mar. 14, 2018, 6 pgs.

Fromknecht, et al., "A Decentralized Public Key Infrastructure with Identity Retention", Nov. 11, 2014, 16 pgs.

Lewison, et al., "Backing Rich Credentials with a Blockchain PKI", Oct. 24, 2016, 19 pgs.

Nakamoto, "Bitcoin: A Peer-to-Peer Electronic Cash System", www.bitcoin.org, 2008, 9 pgs.

Nystrom, et al., "PKCS #10: Certification Request Syntax Specification, Version 1.7", IETF; Network Working Group; Request for Comments: 2986, Nov. 2000, 15 pgs.

* cited by examiner

US 10,958,450 B1

CONSTRUCTING A MULTIPLE-ENTITY ROOT CERTIFICATE DATA BLOCK CHAIN

BACKGROUND

The following description relates to a multiple-entity root certificate data block chain for cryptography systems.

Cryptography systems are used to communicate securely over public channels. For example, some cryptography systems provide confidentiality by encrypting messages, and some cryptography systems provide authenticity through digital signatures. Some cryptography systems operate using public keys, private keys and shared secrets.

DETAILED DESCRIPTION

Figure 1A:
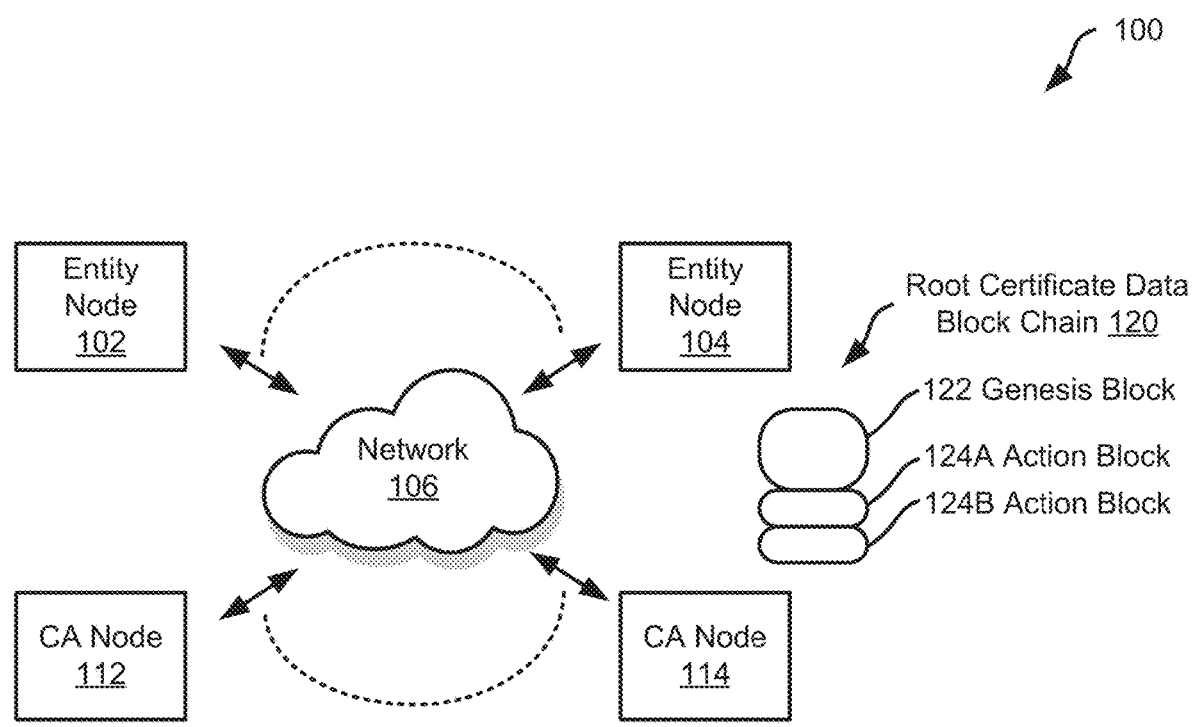
FIG. 1A is a block diagram showing aspects of an example communication system.

In some aspects of what is described here, a decentralized multiple-entity root Certificate Authority (CA) system is constructed for use in a cryptography system. In some instances, implementations of the systems and techniques described here provide technical advantages or improvements over existing technologies. As an example, damage from a compromise of a single entity (e.g., a security compromise arising out of an attack, technical malfunction or other event) can be contained by using a multiple-entity root CA system. For instance, a multiple-entity root CA system may provide a protocol or another formal mechanism to revoke the public key corresponding to the compromised private key from the root CA, or in some cases, to remove the problematic root CA entirely.

Accordingly, aspects of the systems and techniques described here can be used to improve the operation of communications systems (e.g., data networks, etc.), computer systems (e.g., network-connected computers, etc.), smart devices (e.g., so-called "Internet-of-Things" (IoT) devices, etc.) and other classes of technology. For example, a wide variety of modern technologies rely on computer-implemented cryptosystems for secure operation, and the techniques described here can improve such computer-implemented cryptosystems, for example, making them more secure, more efficient or providing other advantages in some instances.

Public key cryptography is extensively deployed in a variety of technologies to achieve secure authentication, secret key sharing, etc. Using a public key, one can verify a digital signature to validate the identity of the communicating party, or to establish a shared secret to securely encrypt a message. Security provided by public key cryptography typically relies on the received public key being securely bound to a legitimate identity in a trusted manner. Without such secure binding, an entity could unknowingly trust the identity of a malicious party that is impersonating the intended party, or send a message to a wrong recipient who is actually an adversary. Two general types of systems have been used to establish trust in a public key that it is bound to a legitimate identity: Public Key Infrastructure (PKI) and web-of-trust.

PKI is currently the most widely deployed mechanism to establish trust in a cryptography system. Conventionally, PKI systems build a hierarchical tree of trusts stemming from a trusted entity referred to as a Root Certificate Authority (Root CA). In a typical PKI system, a CA confirms that a public key belongs to an identity, binds the two with a digital signature, and issues the binding in the form of a digital certificate. Any party (an "end entity") can verify the binding of the public key and an identity by validating the CA's digital signature on the certificate using the CA's public key. Since this validation operation uses the CA's public key, the CA's public key must also be trusted. Therefore, there must be a parent CA that assures that this public key belongs to the CA by issuing a signed certificate. In this manner, the certificates are chained to the Root CA to build trust. And this chain must end somewhere. The last certificate in the chain is referred to as a root certificate and belongs to the Root CA. A root certificate is self-signed because there is no higher third-party CA to provide assurance. Therefore, a root certificate is trusted in a different manner. Typically, methods such as public knowledge or personal communication are used to trust a root certificate.

Traditional PKI systems face certain technical challenges and vulnerabilities. One of the most important vulnerabilities of a PKI system is the Root CA because it can be a single point of failure. If the Root CA is compromised, it can cause a catastrophic breakdown of security of the entire system. An attacker in possession of a compromised Root CA's private key can issue certificates that are verifiable by the root certificate. This means that the attacker can impersonate any entity in the system, potentially causing catastrophic breakdown of security and trust in the entire system. A technology platform that builds the trust tree with multiple root CAs, instead of one, can provide improved security and efficiency, for example, allowing damages from the security compromise of a single entity to be contained or otherwise mitigated.

In some scenarios, the risks and responsibility of the Root CA (a potential single point of failure in conventional PKI), may hinder the deployment of PKI, leaving the system open to some security vulnerabilities. For example, when attempting to build a single PKI system for a consortium of peer (and possibly competing) organizations, it may be that no single organization wants to be liable for security failures, and thus none of the peer organizations volunteers to take on the role of Root CA. Also, the organizations may not want any higher authority governing them. In such a case, a technology platform that constructs a root CA consortium of multiple peer entities would be more attractive and agreeable for constructing a PKI to provide improved security and efficiency.

Conventional PKI systems may be ill-prepared for the catastrophic failure resulting from the compromise of the Root CA's private key, since there is no higher trusted entity above the Root CA that has been given power to revoke a root certificate. There have not been a formal standard mechanism to revoke a root certificate or any mechanism for users to identify the no-longer-valid root certificate. Thus, users of such conventional PKI systems have relied upon public announcements (including e.g. "optional" software updates) and word-of-mouth to identify compromised root certificates. A technology platform that allows the establishment of a more systematic method to identify and revoke root certificates would provide improved security and efficiency.

Another conventional mechanism to build trust using public key cryptography is web-of-trust, which is deployed in systems such as Pretty Good Privacy (PGP). This mechanism was designed to avoid a governing authority, and thus there is no CA in a web-of-trust system. Instead, security in a web-of-trust system is based on peer-to-peer trust. For example, this mechanism may be described as a who-knows-who type of "friends" network of trust, where one trusts those whom they know well ("friends") and assures the binding of a friend's public key and identity by digitally signing the friend's digital certificate. When an entity has many friends, the entity can get a number of signatures on its certificate. Therefore, the amount of assurance on a digital certificate can be measured by two criteria: the number of signatures on the certificate (which, in this context, indicates the number of immediate friends); and the number of hops of chain of certificates (e.g. friends) connected by the signatures to reach the certificate. For example, you may sign the certificate of your immediate friend. Therefore, you trust the certificate because your signature is on the certificate. If a certificate is not your immediate friend's certificate, you may be able to trace the hops of friends from the certificate until you reach someone you trust, which is your immediate friend. One of the notable drawbacks of a conventional web-of-trust is that the trust network must be sizable in order to have a sufficient number of connected paths; otherwise you may not be able to complete the chain, which means the validation will fail. It may take time to build a sufficiently connected network. Conventional web-of-trust can work well for a peer-to-peer large public network, and in other scenarios. However, it may not always be suitable for an organization such as an enterprise or other organization that has a hierarchical structure because it does not allow hierarchy. Furthermore, revocation of a certificate in conventional web-of-trust systems can be difficult since there is no authority to revoke a certificate. Typically, revocation is established through consensus. Such a revocation process will likely take a long time to complete, and the users are left at risk during the process.

In some implementations, multiple-entity root CA systems can provide technical advantages, for example, over conventional PKI systems and conventional web-of-trust systems. For instance, a multiple-entity root CA system can provide a trust mechanism without a single root CA but in which hierarchical structures can be constructed. In addition, the multiple-entity root CA system can provide an efficient mechanism to revoke the public key of the compromised root CA entity.

In a multiple-entity root CA system, a multiple-entity root certificate set is used, for example, instead of using of a single root certificate belonging to a single Root CA. The multiple-entity root certificate set can be or can be represented with a data set, for example, a chain of data blocks, that contains identities and public keys of multiple entities. A multiple-entity root CA system may represent a consortium of member entities (e.g., a committee, organization or other association of entities); the member entities may function as root CAs or end entities (or both). Because the multiple-entity root CA system comprises multiple distinct member entities, no single entity can become a single point of failure. A multiple-entity root certificate data block chain may be published, broadcasted, or distributed (e.g., as a conventional root certificate would be published, broadcasted, or distributed) for use in a cryptography system (e.g., as a conventional root certificate would be used). The multiple-entity root certificate data block chain also allows dynamic changes to the root CA consortium by adding new data blocks to the chain, for example, representing a new entity in the consortium, thus providing flexibility and also enabling revocation of entities. In addition, the multiple-entity root CA system allows for a hierarchical structure, for example, when a member entity also functions as a root CA and, as such, can construct a PKI subtree underneath.

In some implementations, a multiple-entity root CA system reduces at least one layer of hierarchy from a traditional PKI approach since, at least, the Root CA level is removed or replaced. In some cases, if the multiple-entity root certificate system is deployed in the lower layers under the member CA, it may further reduce the number of layers. Additionally, a multiple-entity root CA system can allow multiple cryptographic schemes. As a result, members of the consortium can use one or more signature schemes.

Accordingly, a multiple-entity root certificate set can be dynamic. Example mechanisms to build and maintain a multiple-entity root certificate data block chain in a secure manner, which may be deployed in a multiple-entity root CA technology platform, are described further below.

As an overview of an example implementation, a chain of blocks for a multiple-entity root certificate data block chain may be started from a genesis block. The genesis block can be provided as the initial root certificate data block chain established by the founding members of a root CA consortium. The genesis block may be constructed as follows. For example, the founding members may initially agree to establish a root certificate data block chain. Each founding member has a public-private key pair; a public-private key pair of an entity includes a private key and a corresponding public key, which are related as prescribed by a cryptosystem. The private key is kept as a secret of the entity, while the public key can be published. Once the founding member root CA consortium is established, each founding member digitally signs the combination of its identity and public key. The sets of data for each founding member entity containing the identity, public key, and digital signature are collected by the verification entity to construct a genesis data block. This genesis data block may then be digitally signed by the founding member entities to ensure its integrity and, to record the evidence of approval. These multiple signatures on the genesis data block, and the individual signatures on the identity-public-key combinations, can further contribute to prevent a single point of failure. This genesis data block appended with multiple signatures of the founding member entities becomes the genesis block. The construction of example genesis blocks is described in more detail below with respect to FIGS. 3A-3D.

Whenever changes occur to the root CA consortium (e.g., in the membership to the root CA consortium or otherwise) a new block can be chained. Such changes may include the addition or removal of a member entity, an update, revocation, replacement, addition, or cancellation of a public key of an existing member entity, or another type of change. A new block containing the information of changes as data entries, can be appended to the existing chain of blocks by a cryptographic process, in which the new block of data is concatenated with a hash of the previous block, the last and latest in the chain, and the combination is digitally signed by the consortium member entities. In some implementations, removal of a block from the chain is not permitted, and the blocks are chained in chronological order. Therefore, by tracking the blocks from the latest to older, the current state of the root CA consortium membership can be deterministically indicated, allowing to confirm the validity of the public key for an identity.

Damages from a compromise of the private key of a consortium member entity can be contained because such an entity is not a single point of failure. For instance, the risk of such a compromise may be limited to the subnetwork underneath the compromised member entity, and the subnetworks under the other members remain unaffected. Also, the signatures of multiple entities can be provided on each block, such that a compromise of a single entity is not sufficient to alter the membership data in the chain of blocks. This mechanism may also achieve swift revocation of a public key corresponding to a compromised private key or removal of any problematic member in a secure systematic manner.

Accordingly, aspects of the systems and techniques described here can be used to improve the operation of a multiple-entity root CA system. In some implementations, the multiple-entity root CA system described here may reduce security risks by removing a single point of failure, e.g., a compromised member entity. In some implementations, the multiple-entity root CA system described may perform parallelized, faster construction of genesis blocks or action blocks. In some implementations, the multiple-entity root CA system described here may reduce the bandwidth consumption.

FIG. 1A is a block diagram showing aspects of an example communication system 100. The example communication system 100 shown in FIG. 1A includes four nodes—two entity nodes 102, 104, and two CA nodes 112, 114. The nodes communicate with each other over a network 106. The communication system 100 may include additional or different features, and the components in a communication system may be configured as shown in FIG. 1A or in another manner.

In some implementations, nodes in the communication system 100 have a server-client relationship. For example, the entity node 102 can be a server and the entity node 104 can be its client in a service network, or vice-versa. In some implementations, nodes in the communication system 100 may have a peer-to-peer relationship. For example, the entity nodes 102, 104 can be peers in a service network, in a peer-to-peer network or another type of network. Nodes may have another type of relationship in the communication system 100.

In the example shown in FIG. 1A, the example entity nodes 102, 104 and the CA nodes 112, 114 each have computational resources (e.g., hardware, software, and firmware) that are used to communicate with other nodes. For example, each of the nodes in the communication system 100 shown in FIG. 1A may be implemented as the example computer system 600 shown in FIG. 6 or components thereof. In some implementations, the nodes in the communication system 100 can be implemented in various systems, such as, for example, laptops, desktops, workstations, smartphones, tablets, personal digital assistants, servers, server clusters, mainframes, and other types of computer systems. In some cases, a single device may operate both as an entity node and as a certificate authority node.

In the example shown in FIG. 1A, an end entity (represented by either of the entity nodes 102, 104) or a CA entity (represented by either of the CA nodes 112, 114) may correspond to a computing device, a computer system, an IP address or other network address, or another type of computer-readable identifier or instance of a computer resource. Accordingly, the computations and other operations of each entity may be performed by one or more processors or other elements of the respective node. Similarly, information sent to or received by an entity may be sent to or received by an element (e.g., one or more processors, memories, or interfaces) of the respective node.

The example network 106 can include all or part of a data communication network or another type of communication link. For example, the network 106 can include one or more wired or wireless connections, one or more wired or wireless networks or other communication channels. In some examples, the network 106 includes a Local Area Network (LAN), a Wide Area Network (WAN), a private network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In some instances, the nodes shown in FIG. 1A communicate with each other in a secure manner based on a multiple-entity root certificate data block chain that includes a genesis block and possibly a chain of one or more blocks chained to the genesis block. For instance, the nodes may utilize a cryptography system or another type of system where trust is established based on the example root certificate data block chain 120. The example root certificate data block chain 120 shown in FIG. 1A includes a genesis block 122 and two action blocks 124A, 124B. The first action block 124A is chained to the genesis block 122, and the second action block 124B is chained to the first action block 124A.

Figure 3A:
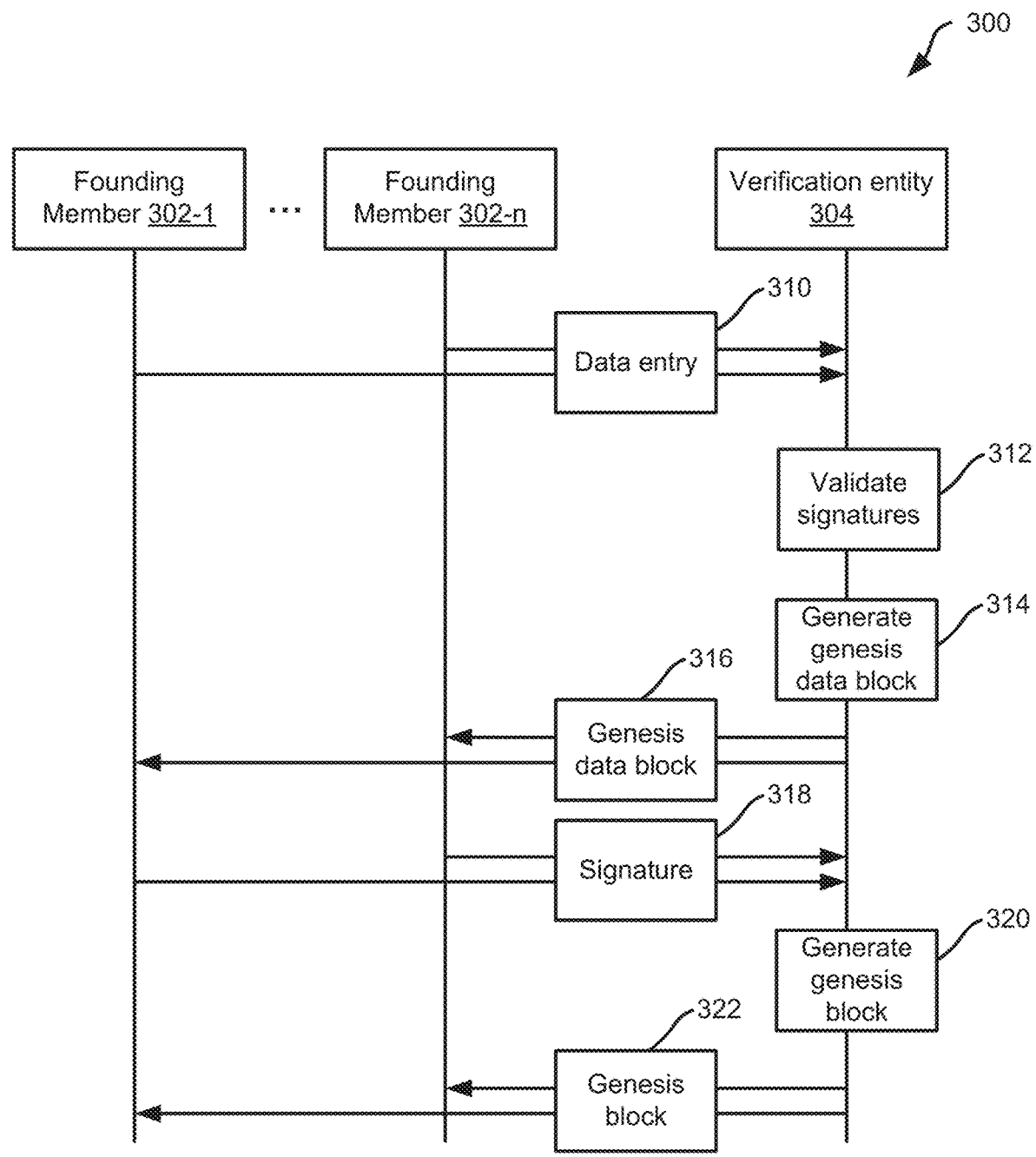
FIG. 3A is a flow diagram showing aspects of an example genesis block creation process.
Figure 3B:
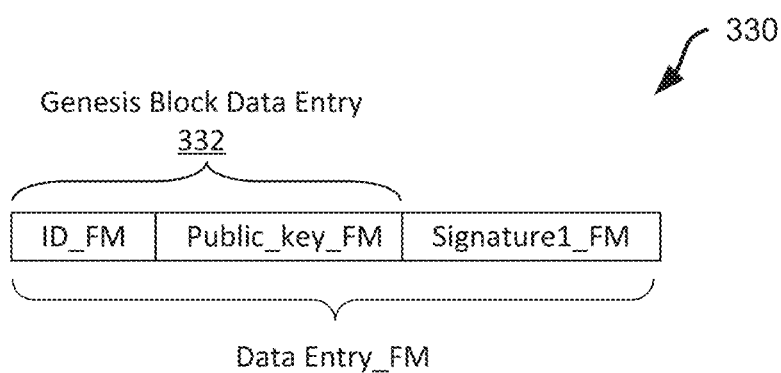
FIG. 3B is a diagram of an example data entry received from a member entity.
Figure 3D:
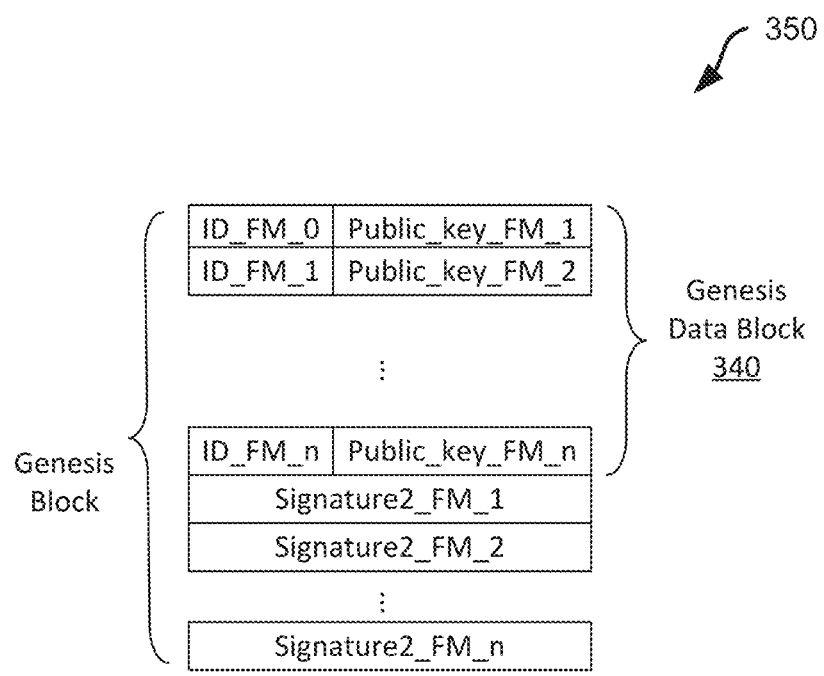
FIG. 3D is a diagram of an example genesis block created by a verification entity based on the genesis data block in FIG. 3C.

Generally, a multiple-entity root certificate data block chain may include only the genesis block 122, or may include any number of action blocks 124. The genesis block 122 is the initial block in a chain that is generated by or on behalf of a root CA consortium, and the action blocks 124A, 124B represent changes related to the root certificate data block chain 120 or the root CA consortium. An example genesis block is shown in FIG. 3D; example action blocks are shown in FIGS. 4D and 5D. The root certificate data block chain 120 may include additional or different types of blocks in some cases.

In some implementations, the CA nodes 112, 114 may issue digital certificates based on the multiple-entity root certificate data block chain 120. As an example, the first CA node 112 may represent a root CA consortium member whose public key is included in the root certificate data block chain 120 (e.g., in the genesis block 122 or in one of the action blocks 124A or both), and the first CA node 112 may issue digital certificates that can be validated using the public key in the root certificate data block chain 120. Accordingly, other entities may use the root certificate data block chain 120 to establish trust in digital certificates issued by the first CA node 112. In some implementations, the second CA node 114 represents another root CA consortium member whose public key is also included in the root certificate data block chain 120 (e.g., in the genesis block 122 or in one of the action blocks 124A or both). Alternatively or additionally, the second CA node 114 can be a subordinate CA that is trusted by other entities based on a digital certificate issued by the first CA node 112.

In some implementations, digital certificates issued by the CA nodes 112, 114 may be used by end entities in a manner that is analogous to the use of digital certificates in conventional PKI systems, except that the digital certificates can be validated to the multiple-entity root certificate data block chain 120 instead of a conventional root certificate. As an example, the end entity may own a digital certificate issued by the CA node 112, wherein the digital certificate contains the end entity's public key and the CA's digital signature that cryptographically binds the end entity's public key with the end entity's identity, so that other end entities can trust the end entity's public key based on verifying the CA's digital signature in the digital certificate. Here, the CA's digital signature is trusted because it is verified using a public key in the root certificate data block chain 120.

In some instances, the entity nodes 102, 104 and the CA nodes 112, 114 can communicate securely over the network 106 using a cryptography system that establishes trust based on the root certificate data block chain 120. For instance, the cryptography system may include cryptographic protocols that use digital certificates that are trusted based on the multiple-entity root certificate data block chain 120.

In some cases, the entity nodes 102, 104 use a digital signature scheme that allows each node to validate the authenticity of messages received from the other node. The digital signature scheme can be, for example, an elliptic curve cryptography (ECC) based signature scheme, an RSA-based signature scheme, a lattice-based signature scheme, a hash-based signature scheme, a multivariate signature scheme or a scheme that uses another type of cryptography. When a digital signature is verified using the signer's public key, the verifier may establish trust in the signer's public key based on the root certificate data block chain 120.

In some cases, the entity nodes 102, 104 use an encryption scheme that allows each node to send confidential messages to the other nodes. The encryption scheme can be, for example, an elliptic curve cryptography (ECC) based encryption scheme, an RSA-based encryption scheme, a lattice-based encryption scheme, a code-based encryption scheme or a scheme that uses another type of cryptography. When a message for a recipient is encrypted using the recipient's public key, the sender may establish trust in the recipient's public key based on the root certificate data block chain 120.

Figure 1B:
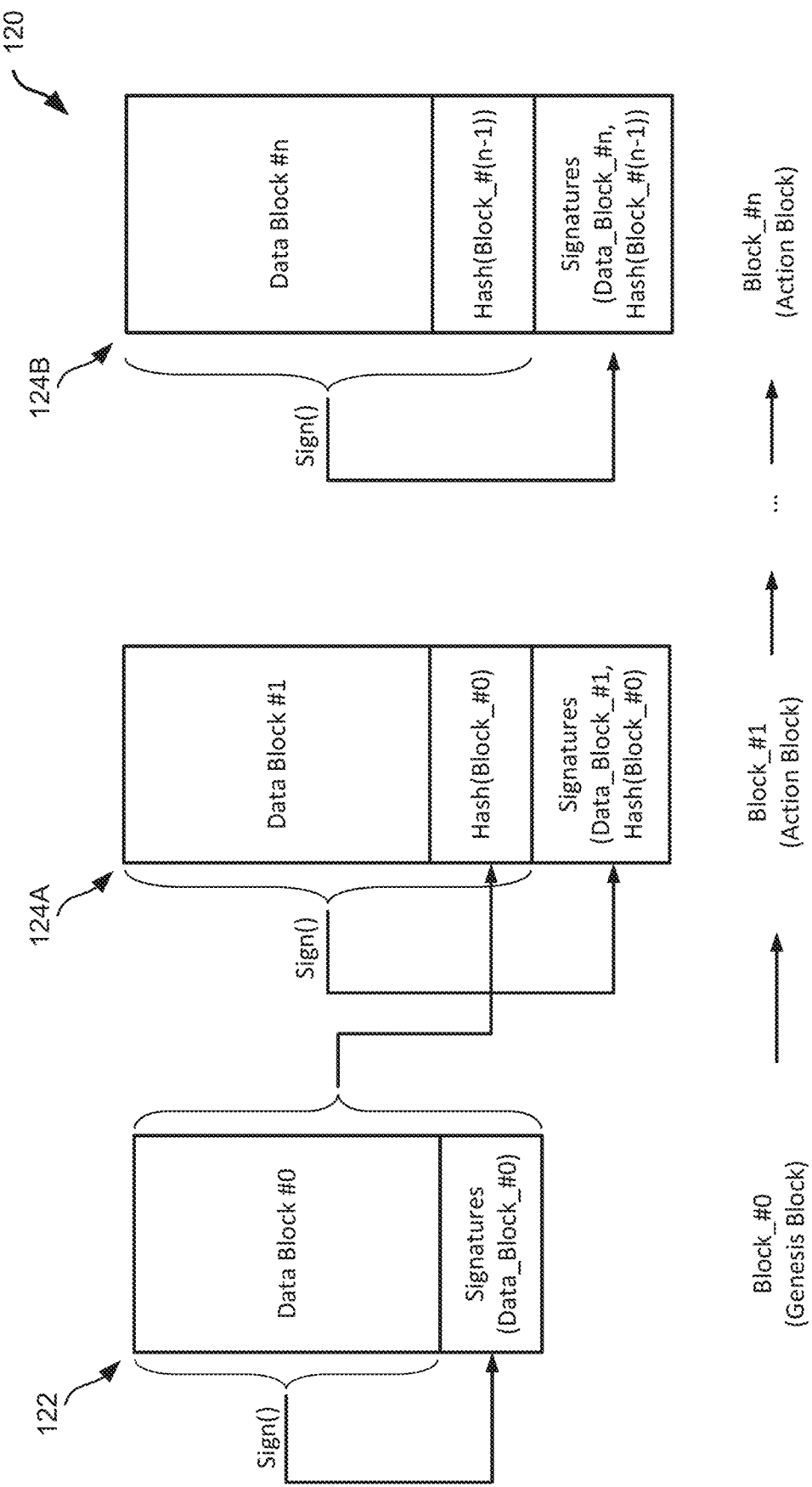
FIG. 1B is a diagram of an example block chain that can be used as the root certificate data block chain in FIG. 1A.

FIG. 1B is a diagram of an example block chain that can be used as the root certificate data block chain 120 in FIG. 1A. The example block chain represented in FIG. 1B includes blocks chained in sequence, e.g., using a block chaining technique according to a consortium blockchain protocol. Unlike public blockchain protocols (e.g., the blockchain technology used by Bitcoin and other forms of cryptocurrency), consortium blockchain protocols do not rely on mining to add new blocks. Instead, a block is added to the chain by an authorized entity, and the cryptographic technology to chain blocks may considerably differ from public blockchain protocols that utilize mining.

In the example shown in FIG. 1B, the chain of blocks is started by a genesis block 122, which is the first block of the chain ("Block_#0"). The example genesis block 122 includes a data block ("Data Block #0"), and a digital signature on the data block. In the process of forming each new block for the chain, a hash of the previous block in the chain is computed by applying a hash function to the previous block; and the hash is appended to the new data block. As shown in FIG. 1B, the action block 124A ("Block_#1") is chained from the genesis block 122; the action block 124A includes a new data block ("Data Block #1") and a hash of the prior block (Hash(Block_#0)). The hash of the genesis block 122 is generated by computing Hash(Block_#0). Here, Hash(•) represents an output hash value generated by applying a cryptographic hash function to an input value (e.g., "Block_#0"). In some implementations, one or more conventional hash functions in the SHA-2 family (e.g., SHA-256, SHA-512) or SHA-3 family can be used. Additional or different hash functions may be used.

In the process of forming each new block for the chain, the hash of the prior block and one or more digital signatures of the new data block is generated; and the digital signatures are appended to the new data block and the hash of the prior block. As shown in FIG. 1B, each digital signature is generated based on the concatenation of the new data block ("Data Block #1") and the hash (Hash(Block_#0)), and the digital signature is appended to form the action block 124A. Typically, a digital signature is generated by a digital signature algorithm operating on inputs that include a private key of the signing entity and a message to be signed (e.g., the data block and the hash shown in FIG. 1B). The digital signature may be generated according to any suitable digital signature algorithm (e.g., RSA, DSA, ECDSA, lattice-based digital signature algorithms, hash-based digital signature algorithms, multivariate digital signature algorithms, etc.).

Each subsequent block of the chain may be generated using a similar process. As shown in FIG. 1B, an action block 124B ("Block_#n") is chained from the prior block ("Block_#(n−1)"), and the action block 124B includes a new data block ("Data Block #n") and a hash of the prior block. Also shown in FIG. 1B, one or more digital signatures are generated based on the concatenation of the new data block ("Data Block #n") and the hash ("Hash(Block_#(n−1))"), and the digital signature is appended to form the action block 124B.

In the example shown in FIG. 1B, the hash of the previous block unambiguously specifies the link between two blocks (e.g., genesis block 122 and action block 124A), and the digital signature ensures the integrity of the new block and the link from the previous block. As shown by the examples in FIGS. 2A-2B, 3A-3D, 4A-4D, and 5A-5D and the related discussion below, the type of data structure and methodology represented in FIG. 1B for building a chain of blocks may be used as a basis to construct a multiple-entity root certificate data block chain.

In some implementations, constructing a multiple-entity root certificate data block chain (e.g., according to the examples in FIGS. 3A-3D, 4A-4D and 5A-5D) builds trust among a network of entities represented by nodes in a communication system. For example, each of the nodes may represent a CA entity or an end entity. The communication channels connecting the nodes may be assumed to be open and public, where no security is applied. The entities represented by the nodes may comprise a community, where some hierarchy may exist in terms of CAs and end entities. A root CA consortium may be formed by a group of member entities (e.g., within a community or otherwise) to establish a multiple-entity root CA system. In an example, a root CA consortium may be led by a government entity. In another example, CAs may be different manufacturers or service providers (e.g., competing brands) from the same industry (e.g., the automotive industry, the banking industry, etc.) that form the consortium. In some cases, members of the consortium include entities in different countries, e.g., to allow mobile phone use in the different countries that may have different authentication systems. Having a multiple-entity root CA system can provide a solution in these and other types of authentication scenarios since there is no single root CA in charge. Additionally, new companies (or other types of entities) may be established, and previous companies may go out of business which may affect the consortium membership. This scenario is also addressed by the multiple-entity root CA system, which is not static and may evolve with a change in membership.

In some implementations, the verification entity does not perform any operations that require secret information, such as a private key or symmetric key. Therefore, there is no risk of leaking sensitive or secret information. In addition, the operations that a verification entity performs can be transparent in the sense that any member, who can participate in data block chain operations, or subscriber, who can only read the data block chain, of the root CA consortium can perform the same operation. This transparency provides tamper evidence and makes compromise of a verification entity very difficult. Since the copies of the data block chain, including the genesis block, are maintained by all the members, an ill behaving or impersonating verification entity can easily be caught by verifying the signatures in the data block chain and comparing the copies of the block chain with other members.

Figure 3C:
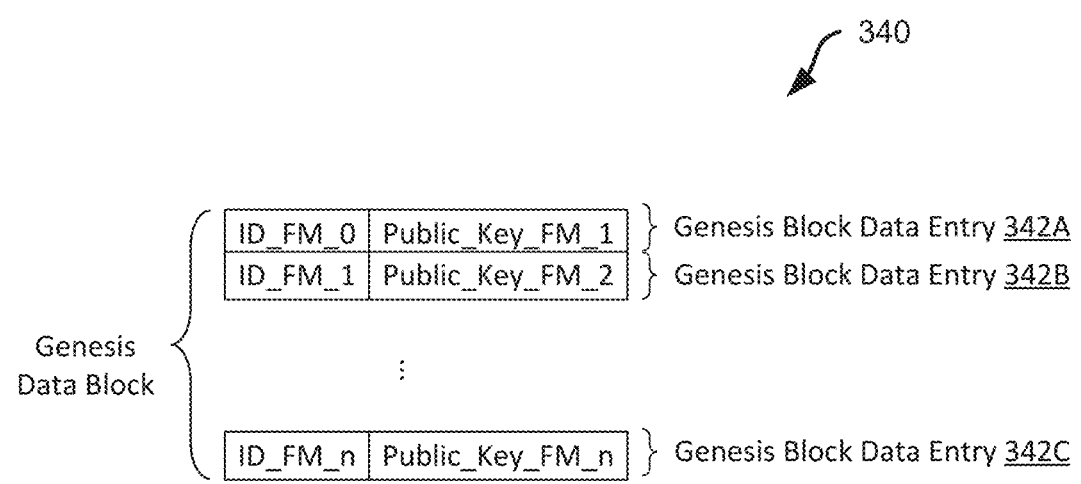
FIG. 3C is a diagram of an example genesis data block created by a verification entity based on genesis block data entries.

When building a genesis block for a multiple-entity root CA system, genesis block data entries can be collected from each founding member to form a data entry array, i.e., genesis data block as shown in FIG. 3C. Then, the array is concatenated with one or more digital signatures. Thus, a genesis block can be made of the following components: a data entry array including the genesis block data entries, and multiple digital signatures of the consortium members. FIG. 3D is a diagram of an example genesis block 350 of a multiple-entity root certificate data block chain. Another type of genesis block may be used in some cases.

When building a chained block (e.g., an action block) in a multiple-entity root CA system, one or more action block data entries can be collected. Then, a hash of a previous/existing block is concatenated with the one or more action block data entries. The concatenated data then is further concatenated with one or more digital signatures. Thus, a chained block can be made of the following components: a data entry or an array of data entries, a hash of the previous block, and one or more digital signatures of the consortium members. FIGS. 4D and 5D show a diagram of an example chain of blocks of a multiple-entity root certificate data block chain.

Figure 2A:
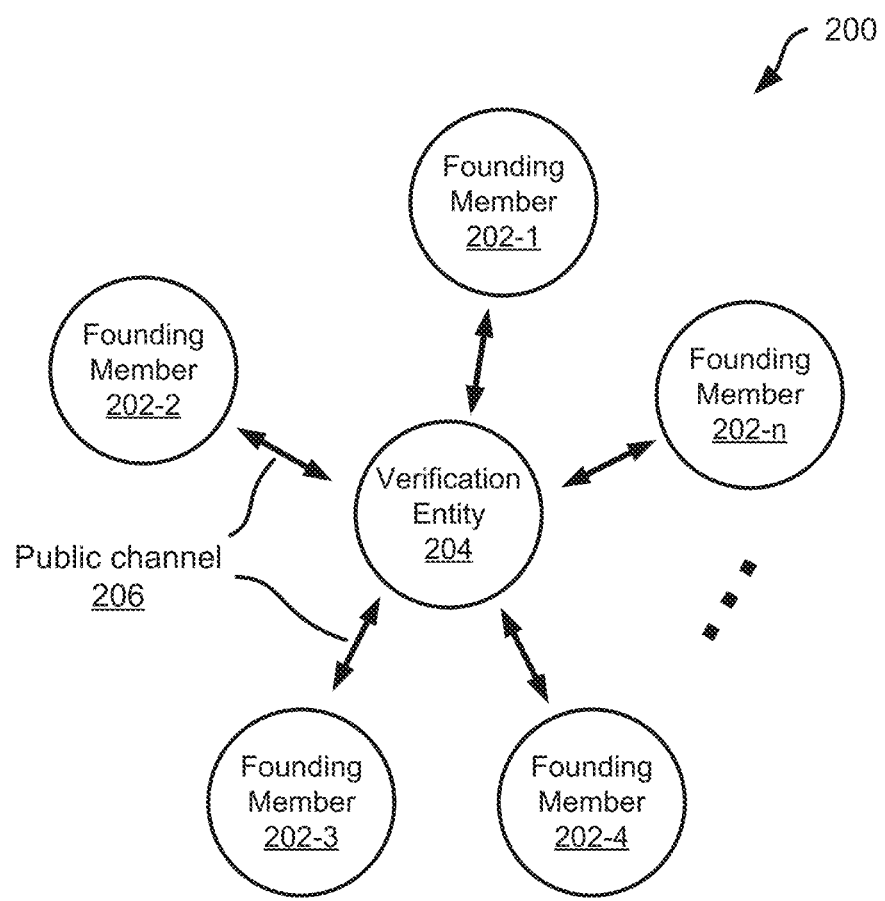
FIG. 2A is a diagram of an example signing process for a genesis block of a multiple-entity root certificate data block chain.

FIG. 2A is an illustration of an example signing process 200 for a genesis block of a multiple-entity root certificate data block chain. The example signing process 200 is performed by a verification entity 204 and a root CA consortium that includes multiple founding member entities, e.g., founding members 202-1, 202-2, 202-3, 202-4 and 202-n shown in FIG. 2A. In the example shown in FIG. 2A, the founding member entities form a root CA consortium at the time of creating the multiple-entity root certificate data block chain. In some examples, the verification entity 204 may be implemented as a founding member, or as an independent node. In some cases, since there is not necessarily any secret information in what is communicated, an open public channel 206 may be used to communicate between each of the founding members 202 and the verification entity 204.

In some examples, the verification entity 204 receives data entries from the founding members 202; verifies signatures of the founding members 202; generates a genesis data block and sends it to the founding members; receives signatures on the genesis data block from the founding members; and generates a genesis block for use by one or more end entities as a root certificate data block chain in a cryptography system, as shown in FIGS. 3A-3D. The verification entity 204 may perform additional or different operations.

Figure 2B:
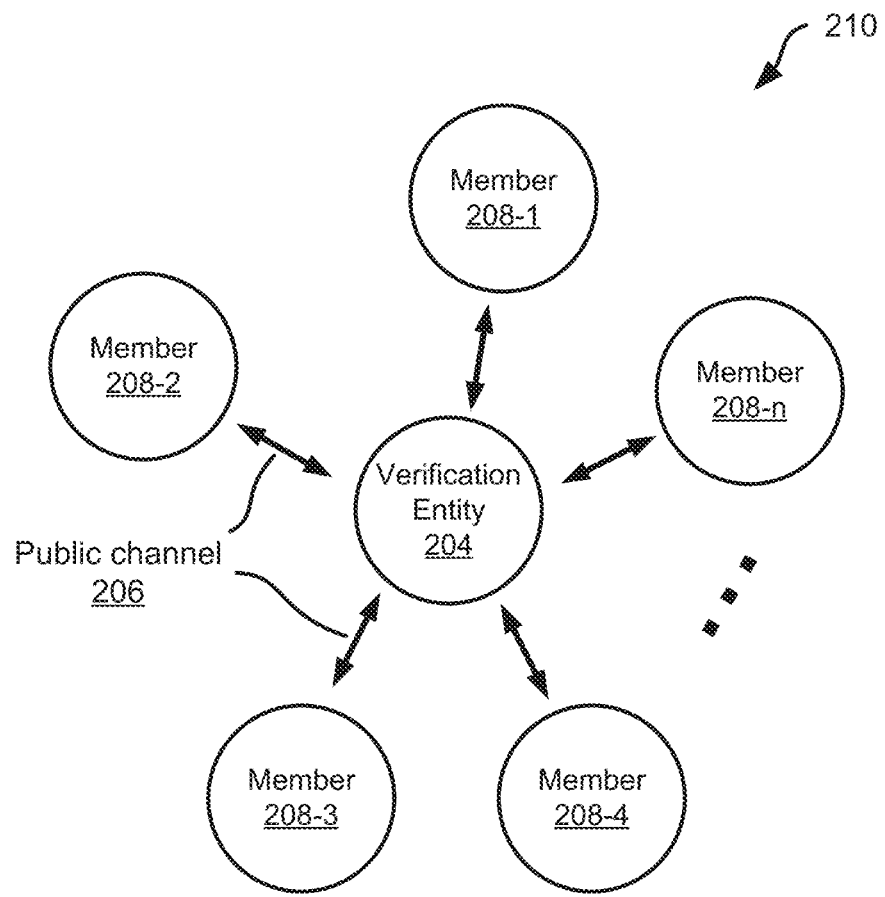
FIG. 2B is a diagram of an example signing process for an action block of a multiple-entity root certificate data block chain.

FIG. 2B is a diagram of an example signing process 210 for an action block of a multiple-entity root certificate data block chain. The example signing process 200 is performed by a verification entity 204 and a root CA consortium that includes multiple members. In the example shown in FIG. 2B, the root CA consortium at the time of adding an action block includes members 208-1, 208-2, 208-3, 208-4, and 208-n. In the example shown in FIG. 2B, one or more of the members (208-1, . . . 208-n) is also a founding members from FIG. 2A (202-1, . . . 202-n).

In some examples, the verification entity 204 receives a data entry from a requesting entity, validates a signature of the requesting entity, and generates an action block as shown in FIGS. 4A-4D. The requesting entity may be one of the current, valid members or a new entity that wishes to join the multiple-entity root CA consortium 200. For example, a requesting entity may be needed when adding a new public key (which may correspond to the action types of "new", "update", "replace", or "add") because the verification entity 204 needs the requester's signature to prove the possession of corresponding private key. In some examples, there is no requesting entity, and the verification entity 204 generates an action block as shown in FIGS. 5A-5D.

FIG. 3A is a flow diagram showing aspects of an example genesis block creation process 300. In some implementations, the genesis block creation process 300 includes communication of data between founding members 302-1, . . . , 302-n (e.g., entities in the consortium discussed above) and a verification entity 304. In the example shown in FIG. 3A, the founding member entities form a root CA consortium. In some cases, since there is not necessarily any secret information in what is communicated, an open public channel may be used to communicate this information. In some examples, the verification entity 304 may be implemented as a founding member, or as an independent node. The genesis block creation process 300 may be performed in the order shown in FIG. 3A or in another order, or in series or in parallel in some cases.

In some contexts, one of the founding members 302 of the consortium can be identified as the verification entity 304 to perform the process of creating the genesis block. For example, the founding members 302 may meet and agree to delegate the genesis block creation task to one of the members, acting as a verification entity 304. In some contexts, an independent entity (independent of the founding members 302 of the consortium) can be identified as the verification entity 304 to perform the process of creating the genesis block. For example, the founding members 302 may meet and agree to delegate the genesis block creation task to an independent, outside entity, acting as a verification entity 304.

In the example shown in FIG. 3A, the verification entity 304 receives data entries from the consortium members (founding members 302), verifies signatures and assembles the genesis block. Furthermore, the verification entity 304 publishes the resultant genesis block to all of the founding members 302.

At 310, the verification entity 304 receives data entries from the founding members 302-1, ..., 302-n. FIG. 3B is a diagram of an example data entry 330 received from a member entity. In the example shown in FIG. 3B, the data entry 330 received from a corresponding founding member 302 includes a genesis block data entry 332 and a signature of the corresponding founding member (Signature1_FM). The example genesis block data entry 332 includes the identifying information (ID_FM) and the public key (Public_key_FM) of the corresponding founding member.

In some examples, the ID data field (ID_FM) includes identity information regarding the founding member 302. The public key data field (Public_key_FM) may have a data structure comprising components including, for example, a cryptosystem with domain parameters that the public key belongs to, a public key, and an expiry date, that in some cases, may include a time of expiry or other representation of time, e.g. duration. The digital signature data field (Signature1_FM) may include components, including, for example, an identity of a signer, a cryptosystem with domain parameters that the signature is generated over, a digital signature, and a time stamp.

At 312, the verification entity 304 verifies the signatures in the data entries received from the founding members 302. The verification entity 304 validates the signatures in each of the genesis block data entries 332 before constructing the genesis data block to be signed by the founding members 302. In some instances, the verification entity 304 verifies the signature based on a signature verification algorithm. In some examples, the signature verification algorithm corresponding to the digital signature algorithm used to generate the signature uses the public key of entities. If a signature cannot be verified (e.g., if verification fails), the genesis data block entry may be excluded from the genesis data block upon forming.

At 314, the verification entity 304 forms a genesis data block. After verification of all the signatures of the founding members 302, the verification entity 304 forms the genesis data block, which may include an array of genesis block data entries. FIG. 3C is a diagram of an example genesis block 340 created by a verification entity based on genesis block data entries. In the example shown in FIG. 3C, the genesis block data entries 342A, 342B, ... 342C for each founding member are concatenated to form the genesis data block 340, which includes an array of the genesis block data entries 342A, 342B, ... 342C.

In the example shown in FIG. 3C, each genesis block data entry 342A, 342B, 342C includes a public key of the founding member represented by the genesis block data entry. For example, genesis block data entry 342A represents FM_0 and includes the public key ("Public_Key_FM_0") of FM_0; genesis block data entry 242B represents FM_1 and includes the public key ("Public_Key_FM_1") of FM_1; etc. The public key can be, for example, the public key of a public-private key pair generated for use in a cryptography system (e.g., according to a key generation method specified by the cryptography system).

At 316, the verification entity 304 delivers the genesis data block 340 to the founding members 302. In some aspects of operation, the genesis data block 340 may be sent to a subset (e.g., one, some or all) of the founding members 302. In some implementations, after receiving the genesis data block 340 from the verification entity 304, each of the founding members 302 digitally signs the genesis data block 340. In some implementations, a subset of the founding members digitally signs the genesis data block 340. In some instances, the digital signatures can be generated using the corresponding founding member's private key. In some implementations, the digital signatures are generated by a digital signature algorithm operating on inputs that include a private key of the signing entity and a message to be signed (e.g., the genesis data block 340 as shown in FIG. 3C). The digital signatures may be generated according to any suitable digital signature algorithm (e.g., RSA, DSA, ECDSA, lattice-based digital signature algorithms, hash-based digital signature algorithms, multivariate digital signature algorithms, etc.).

In the example process 300 shown in FIG. 3A, if the verification entity 304 learns that a founding member was compromised before the genesis data block was delivered (at 316), the verification entity 304 may remove the genesis block data entry 332 of the compromised founding member from the genesis data block 340 before the genesis data block 340 is sent to the other founding members 302 for signature.

At 318, the verification entity 304 receives signatures from the founding members 302. In this example, the signatures received at 318 are a second set of signatures from the founding members 302. In some instances, the verification entity 304 may optionally verify the second signatures received from the founding members 302. In some instances, the public key of a corresponding founding member is used to verify the second signature of the corresponding founding member. In some instances, the verification entity 304 verifies the signature based on a signature verification algorithm. The signature verification algorithm may correspond to the digital signature algorithm used to generate the signature uses the public key of entities. If a signature cannot be verified (e.g., if verification fails), the process may be aborted. In some instances, this signature verification process of the second signature may be omitted.

At 320, the verification entity 304 forms the genesis block. FIG. 3D is a diagram of an example genesis block 350 created by a verification entity based on the genesis data block 340 shown in FIG. 3C. The second set of signatures (Signature2_FM_1, Signature2_FM_2, etc.) of the founding members are combined and then concatenated with the genesis data block 340 by the verification entity 304 to form the genesis block 350.

At 322, the verification entity 304 publishes the genesis block to the founding members 302. In some cases, after the genesis block is created, a data block chain comprising the genesis block is provided for use, by one or more end entities, as a root certificate data block chain in a cryptography system. In some implementations, the genesis block 350 may be stored by the founding members 302, the end entities or both.

Also after the genesis block is created, additional data blocks in the chain may be constructed after 322. Valid identities and public keys of the members of the multiple-entity root CA consortium can be represented by a chain of blocks stemming from the genesis block, where any changes to the multiple-entity root CA consortium, e.g., additions or deletion of member in the consortium, are recorded by the chained blocks. In the examples shown in FIGS. 4A and 5A, a single block is added to the prior block of the chain at a time, creating a single thread chain. For instance, the chain of blocks can be deployed as an append-only chain, where no removal of a block from the chain is permitted. This means that the blocks are chained in a chronological order, where the last block is the latest. Therefore, in order to verify a signature by a member claiming to belong to the root CA consortium, one can trace the chain from the last block to find the first (e.g., latest) appearance of this member's identity to determine the validity of the member CA and to find a valid public key, if the member is valid, and to use the public key to validate the signature.

Using the example process 300 shown in FIG. 3A to create the genesis block, the speed of this creation process can be improved. The handshake/communication between the verification entity 304 and each of the founding members 302 is independent and synchronization occurs twice on the verification entity 304: at 314, when the genesis data block 340 is generated, and at 320, when the genesis block 350 is generated. Other steps in the example process 300 shown in FIG. 3A can be performed in parallel. For example, the data entries of the founding members 302 may be received in parallel by the verification entity 304 from founding members 302. In this example, the bandwidth consumption for each data handshake between a founding member and the verification entity may be limited to the size of the data entry 330 containing the ID, the public key, and the signature, as shown in FIG. 3B. Therefore, the total bandwidth consumption linearly increases with the number of founding members and the increase in bandwidth can be scalable.

Figure 4A:
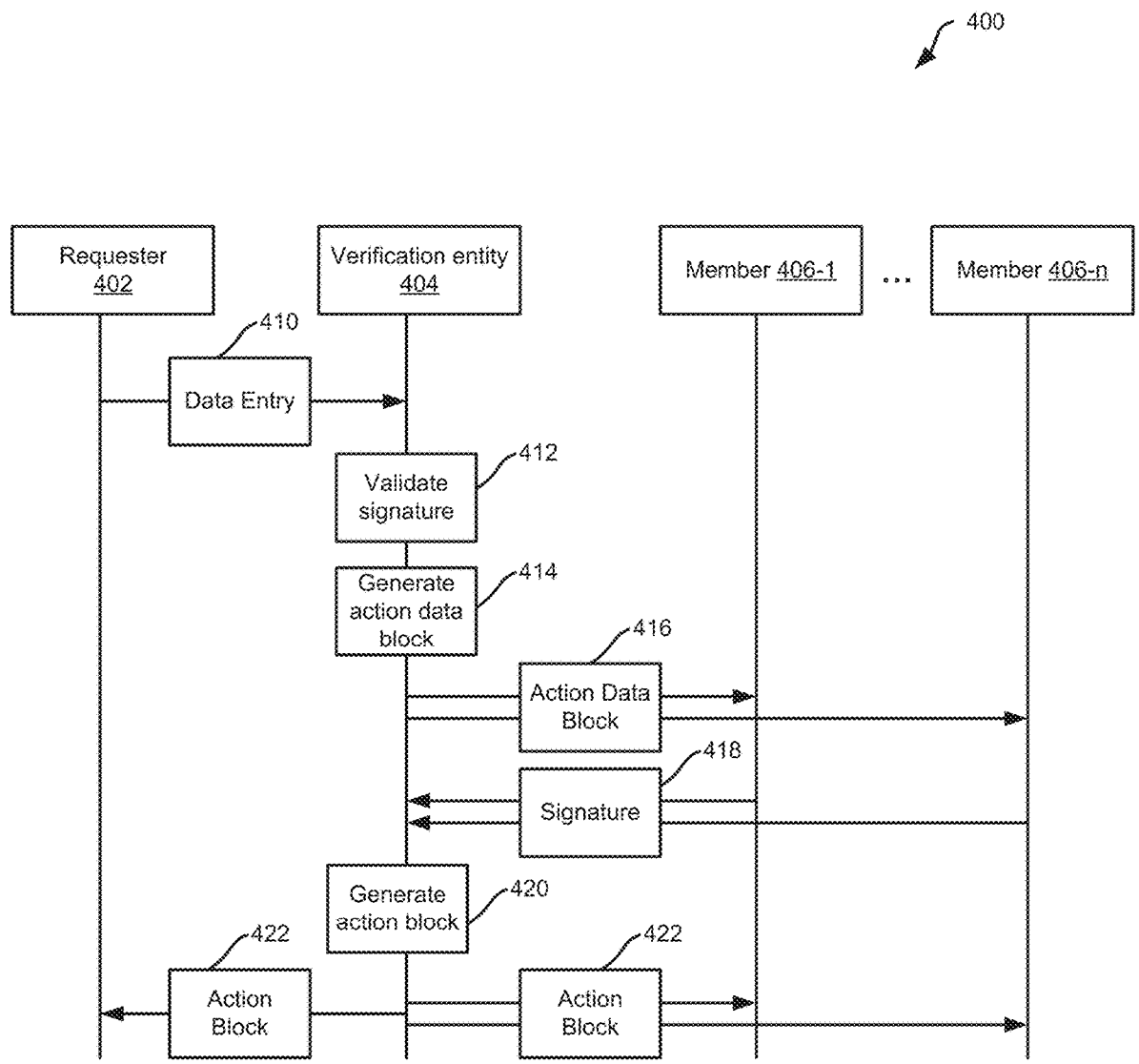
FIG. 4A a flow diagram showing aspects of an example process to create an action block.

FIG. 4A is a flow diagram showing aspects of an example process 400 to create an action block. In some implementations, the process 400 to form an action block includes communication of data between valid members of the root CA consortium 406-1, . . . , 406-n, a verification entity 404 and a requesting entity 402. The valid members 406-1, . . . , 406-n may include one or more of the founding members, one or more other member that were added after the root certificate data block chain was created, or a combination. In some instances (e.g., when the action type is "update", "replace", or "add"), the requesting entity 402 is a member of the root CA consortium (e.g., a founding member or another member that was added after the root certificate data block chain was created). In some instances (e.g., when the action type is "new"), the requesting entity 402 is not a member of the root CA consortium and wishes to join the root CA consortium. In some cases, since there is not necessarily any secret information in what is communicated, an open public channel may be used to communicate this information. In some examples, the verification entity 404 may be implemented as a member of the root CA consortium, or as an independent node. The process 400 may be performed in the order shown in FIG. 4A or in another order, or in series or in parallel in some cases.

In the example shown in FIG. 4A, the verification entity 404 receives a data entry from the requesting entity 402, verifies a signature of the requesting entity 402, obtains the hash of a previous block, assembles the action data block, which is used to generate the action block, and completes the action block. Furthermore, the verification entity 402 shares the resultant action block with the members of consortium 406 and the requesting entity 402.

In some implementations, the requesting entity 402 may be one of the members of the consortium which needs to perform certain actions such as, for example, add or update their public key. In some other implementations, the requesting entity 402 may be a new member to be added to the root CA consortium.

In some implementations, each time a new block (e.g., an action block) is added, a hash of a previous block of the chain is obtained (e.g., by applying a hash function to the most recently added block); a new data block comprising a new data entry is generated, such that the new data entry identifies an action needed to update the information regarding the root CA consortium with associated information; and the new block is completed by digitally signing a combination (e.g., a concatenation) of the new data block entry and the hash of the previous block. The digital signature may be produced by multiple members. The new block is then published by the verification entity 404 to some or all members of the root CA consortium 406.

At 410, the verification entity 404 collects a data entry from the requesting entity 402. In some examples, when the requesting entity is an existing member, the data entry from the requesting entity 402 reported to the verification entity 404 may contain data for an action such as, for example, update, replacement, or addition of a public key. In some examples, when the requesting entity 402 is not an existing member, the data entry from the requesting entity 402 reported to the verification entity 404 may contain data for an action such as, for example, the addition of a new member. In some examples, the requesting entity 402 with the new public key presents its digital signature to prove the possession of the corresponding private key, e.g. in a similar manner as described in the Certificate Signing Request Standard (IETF RFC 2986 PKCS #10).

Figure 4B:
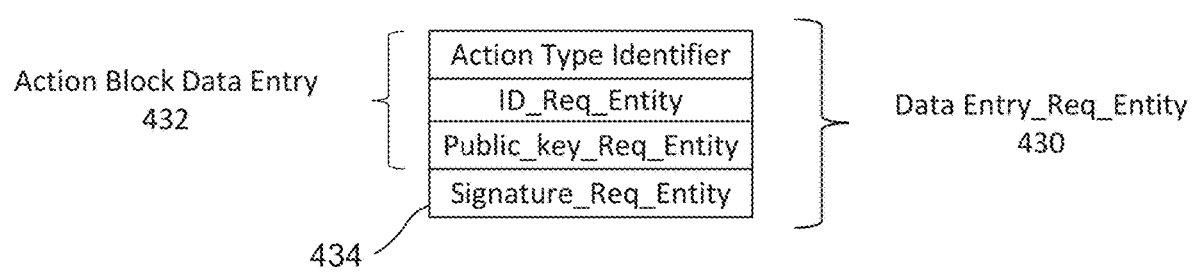
FIG. 4B is a diagram of an example action block data entry received from a requesting entity.

In the example shown in FIG. 4B, the example data entry 430 received from the requesting entity 402 (Data Entry_Req_Entity) includes an action block data entry 432 and a digital signature 434 of the requesting entity 402 (Signature_Req_entity). The action block data entry 432 includes the action type identifier, the identifying information (ID_Req_Entity) of the requesting entity 402 and the public key (Public_key_Req_Entity) of the requesting entity 402. In the example shown in FIG. 4B, the action data block entry 432 may include an action type identifier (e.g., "new") indicating that a new member is being added to the root CA consortium or another type of action block identifier.

In some examples, the ID data field (ID_Req_Entity) includes identity information regarding the requesting entity 402. The public key data field (Public_key_Req_Entity) may have a data structure comprising components including, for example, a cryptosystem with domain parameters that the public key belongs to, a public key, and an expiry date, that in some cases, may include a time of expiry or other representation of time, e.g. duration. The digital signature data field (Signature_Req_entity) may include components, including, for example, an identity of a signer, a cryptosystem with domain parameters that the signature is generated over, a digital signature, and a time stamp.

At 412, the verification entity 404 verifies the signature of the requesting entity 402. In some instances, the public key of the requesting entity 402 may be used to verify the signature. In some instances, the verification entity 404 verifies the signature based on a signature validation algorithm. In some examples, the signature verification algorithm corresponding to the digital signature algorithm used to generate the signature uses the public key of entities.

Figure 4C:
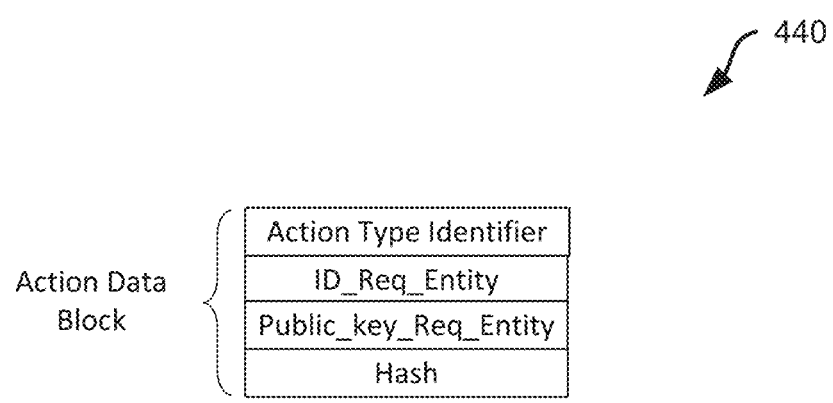
FIG. 4C is a diagram of an example action data block created by a verification entity based on the action block data entry in FIG. 4B.
Figure 4D:
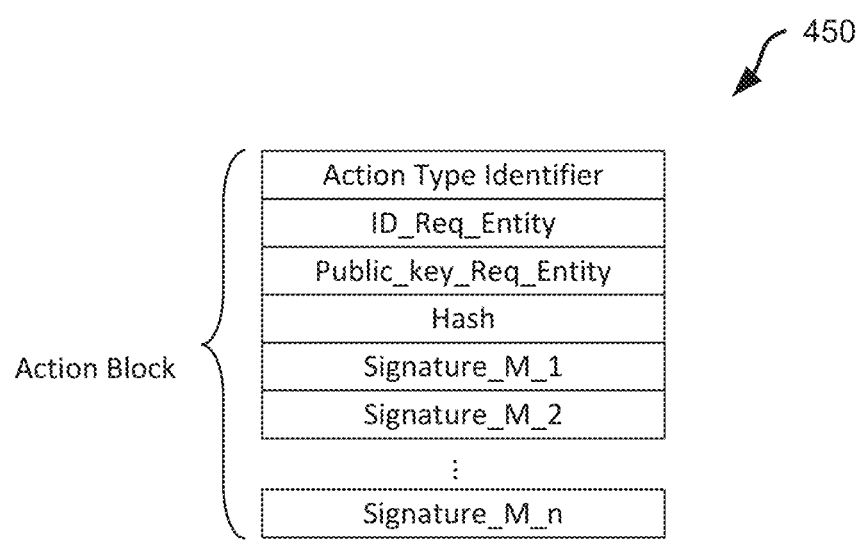
FIG. 4D is a diagram of an example action block created by a verification entity based on the action data block in FIG. 4C.

At 414, the verification entity 404 forms an action data block. FIG. 4C is a diagram of an example action data block 440 created by a verification entity based on the action block data entry 430 in FIG. 4B. The example action data block 440 includes data from the action block data entry 432 (the action type identifier, the identifying information (ID_Req_Entity) of the requesting entity 402 and the public key (Public_key_Req_Entity) of the requesting entity 402). The example action data block 440 includes also a hash of a previous block from the block chain. The hash of the previous block is generated by computing Hash(previous block). Here, Hash(•) represents an output hash value generated by applying a cryptographic hash function to an input value (e.g., "existing block"). In some implementations, one or more conventional hash functions in the SHA-2 family (e.g., SHA-256, SHA-512) or SHA-3 family can be used. Anther hash function may be used.

In the process of forming a new action data block for the chain, the hash of the existing block and a digital signature of the new data block are generated; and the digital signature is appended to the new action data block entry and the hash of the prior block. At 416, the verification entity 404 delivers the action data block to the members of the root CA consortium 406. In some aspects of operation, the action data block 440 is sent to a subset (i.e., one, some or all) of the members of the root CA consortium 406. In some implementations, after receiving the action data block 440 from the verification entity 404, each of the members 406 digitally signs the action data block. In some instances, the digital signature can be generated using the corresponding member's private key. In some implementations, the digital signature is generated by a digital signature algorithm operating on inputs that include a private key of the signing entity and a message to be signed (e.g., the action data block 440 as shown in FIG. 4C). The digital signature may be generated according to any suitable digital signature algorithm (e.g., RSA, DSA, ECDSA, lattice-based digital signature algorithms, hash-based digital signature algorithms, multivariate signature algorithms, etc.).

At 418, the verification entity 404 receives digital signatures from the members of the root CA consortium 406. In some instances, the verification entity 404 may optionally verify the digital signatures received from the members 406. In some instances, the verification entity 404 verifies the signature based on a signature verification algorithm. In some examples, the signature verification algorithm corresponding to the digital signature algorithm used to generate the signature uses the public key of entities. In some instances, this validation process of the digital signature may be omitted.

At 420, the verification entity 404 generates an action block. FIG. 4D is a diagram of an example action block 450 created by a verification entity based on the action data block 440 in FIG. 4C. As shown in FIG. 4D, to form the new action block 450, the verification entity combines the action data block 440 with the digital signatures of members of the root CA consortium (Signature_M_1, Signature_M_2, . . . Signature_M_n).

At 422, the verification entity 404 publishes the action block to the members of the root CA consortium 406 and the requesting entity 402, which now belongs to the root CA consortium. In some cases, after the action block is created, a data block chain comprising the action block is provided for use, by one or more end entities, as a root certificate data block chain in a cryptography system. In some implementations, the action block may be stored by the members, the end entities, or both.

In the example shown in FIG. 4A, the verification entity 404 is configured to lead the process of chaining a block (e.g., for a current round). This verification entity 404 for creating a chained block may be the same or different from the verification entity 304 used in the genesis block creation process as shown in FIG. 3A. Also, in some cases, different verification entities may be selected for different blocks. This may be important, for example, if a member is removed from the root CA consortium or in other scenarios. In some implementations, all communication for constructing blocks may be executed over open public channels.

Using the example process 400 shown in FIG. 4A to chain a block, the speed of adding an action block may be improved. The communication between the verification entity 404 and each of the members of the root CA consortium 406 is independent and can be performed in parallel. For example, the delivery of the action data blocks to the members 406 at 416 and the reception of the digital signatures of the members 406 at 418 may be performed in parallel.

Possible action types (and associated action type identifiers) that can be identified in a data entry in FIGS. 4A-4D include: adding a member ("new"); updating a public key ("update"); replacing a public key after revocation ("replace"); adding a public key ("add"); and possibly others.

Figure 5A:
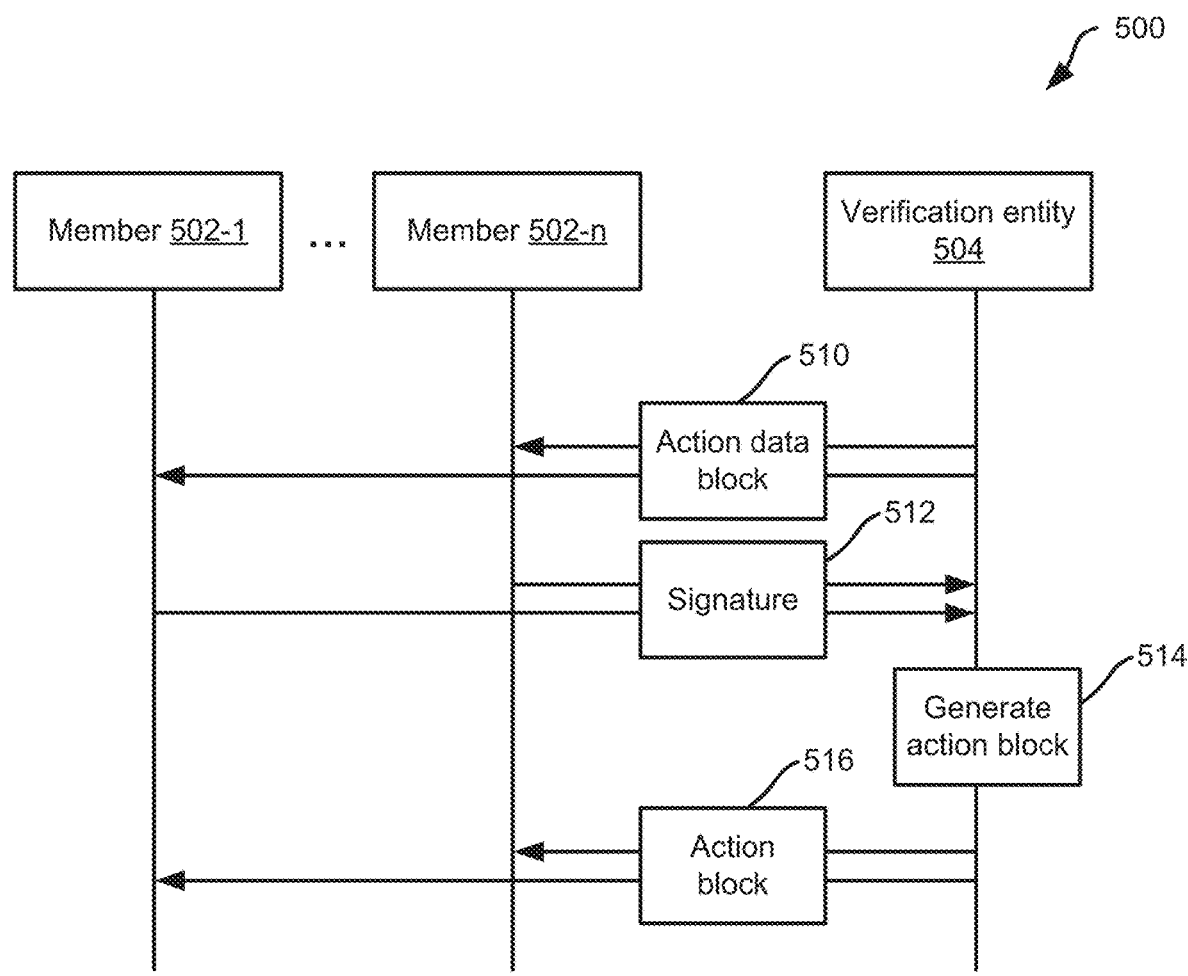
FIG. 5A a flow diagram showing aspects of an example process to create an action block.
Figure 5B:
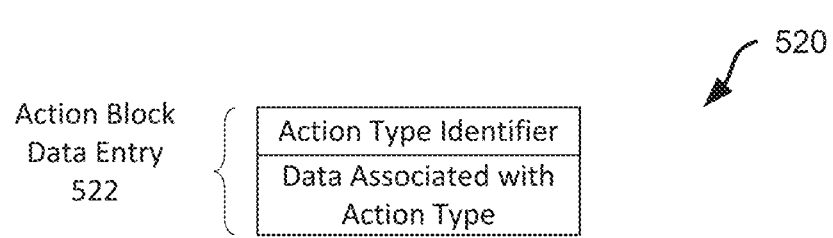
FIG. 5B is a diagram of an example action block data entry.

FIG. 5A is a flow diagram showing aspects of an example process 500 to create an action block by adding a new block to a chain of existing blocks. The example process 500 is performed by valid members of the root CA consortium 502-1, . . . , 502-n (e.g., entities in the root CA consortium discussed above), and a verification entity 504. The valid members 502-1, . . . , 502-n may include one or more of the founding members, one or more other member that were added after the root certificate data block chain was created, or a combination. In some cases during the process 500, information communicated among entities does not necessarily contain any secret information, and an open public channel may be used to communicate this information. In some examples, the verification entity 504 may be implemented as a member, or as an independent node. The process 500 may be performed in the order shown in FIG. 5A or in another order, or in series or in parallel in some cases.

In the example shown in FIG. 5A, the verification entity 504 delivers an action data block to the members 502, obtains the hash of an existing block, receives the signatures on the action data block from members 502 and generates the action block. Furthermore, the resultant action block may be published by the verification entity 504 to the members 502.

Figure 5C:
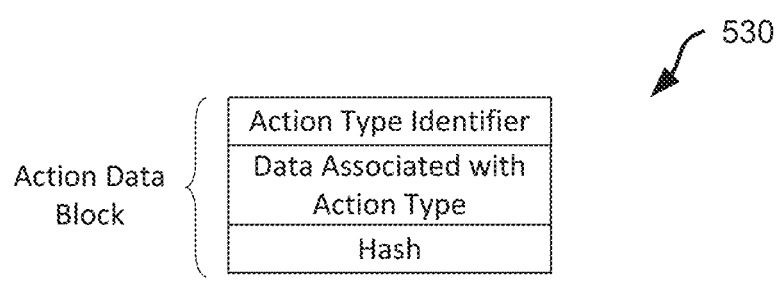
FIG. 5C is a diagram of an example action data block created by a verification entity based on the action block data entry in FIG. 5B.
Figure 5D:
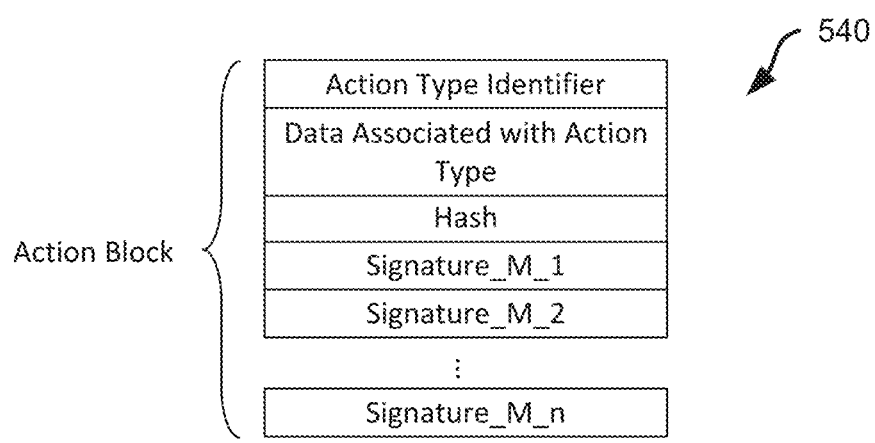
FIG. 5D is a diagram of an example action block created by a verification entity based on the action data block in FIG. 5C.

At 510, the verification entity 504 delivers an action data block to the members of the root CA consortium. The action data block is based on an action block data entry. In the example shown in FIG. 5B, a data entry 520 includes an action block data entry 522. The action block data entry 522 includes the action type identifier and data associated with the action type. The action type identifier specifies an action requested by the root CA consortium on the multiple-entity root certificate data block chain. FIG. 5C is a diagram of an example action data block 530 created by a verification entity based on the action block data entry 522 in FIG. 5B. The example action data block 530 includes a hash appended to the action type identifier and the data associated with the action type from the action block data entry 522.

Possible action types (and associated action type identifiers) that can be identified in a data entry in FIGS. 5A-5D include: removing a member ("remove"); revoking a public key ("revoking"); canceling an old public key ("cancel"); timestamp ("timestamp"); known status ("status); freeze ("freeze"), unfreeze ("unfreeze"); and possibly others.

In some cases, other types of actions may be defined and utilized. Examples of how the action types listed above may be defined and utilized will now be described. These and other action types may be implemented in another manner.

The action of "new" is used to add a new member. For example, this action indicates that this member did not exist in the root CA consortium. Thus, a new identity along with its associated public key appears in a data entry.

The action of "remove" is used to remove a member from the root CA consortium. This is a stronger action than revoking a public key because it indicates that the member is not behaving, and not that simply its private key was compromised. In this case, there is no need for a public key, and including the identity of the misbehaving member suffices.

The action of "update" is used when a public key is about to expire. Thus, this action enables a grace period where the two public keys of the same cryptosystem with the same security strength co-exist for an identity until the old one expires. The updated public key can be specified in the data entry.

The action of "replace" is used when a public key has been revoked. The owner of the revoked public key can replace the revoked public key with a replacing public key. The replacing public key can be specified in the data entry.

The actions of "revoke" prompts immediate invalidation of the public key. The revoked public key is specified in the data entry. Once a public key is revoked, owner of this public key may be reactivated by the "replace" action.

The action of "add" allows for adding a second public key for an existing identity, for example, creating a situation where a member owns two valid public keys simultaneously. This can be useful in a migration scenario, where the second public key belongs to a different cryptosystem, or to the same cryptosystem but with a different security strength. The second public key is for the new cryptosystem, or the security strength, or both, that the system is migrating to.

The old public key in the migration initiated by the "add" action can be deactivated by the "cancel" action. In some implementations, "revoke" may be used to indicate this "cancel" action.

The "timestamp" action may be used to indicate that the chain is up-to-date and was correct at the published time and date. A consortium would be free to choose a suitable interval to publish "timestamp" blocks. In some implementations, the absence of recent "timestamp" blocks in the published chain could be interpreted by a client as an indication that the latest blocks of the chain have been withheld or not published.

The "status" action may be used to record a summary of all currently valid identity information. Such a block may be redundant, as it contains information that is calculable from earlier blocks. A "status" block can be considered as an intermediate genesis block. Consumers (especially on constrained devices) could validate a status block per normal when received. Future chain validation would work from the current end of the chain to a previously validated status block allowing a reduction in work required to verify trust. The entire chain would still be available for cases where complete validation was desired.

The "freeze" action is optional. This action indicates that a new block will not be updated, i.e., no actions will be taken, for a certain amount of time. Thus, this action block must associate the time period, or the expiration time, of the frozen period. This time may be used to allow the members to synchronize the chain of blocks. Also, optionally, no time may be specified, indicating that the chain of block is frozen indefinitely. This can be used to terminate the chain, for example.

The "unfreeze" action is optional. This action is used only when accidental or malicious use of "freeze" action is detected. This action can undo such a "freeze" action.

In some implementations, the action types introduced above for managing members and public keys provides functionality to migrate to a new cryptosystem accomplishing cryptographic agility. For example, when migration of a public key algorithm from an old one to a new one is needed, the action types allow for the fast addition of a second public key for a new identity, creating a migration period, and a defined method to revoke the old public key later on, when migration is complete.

In some implementations, it is allowed to have digital signatures on each data entry as well as an entire block in the multiple-entity root certificate data block chain. To avoid a single point of failure, it may be ensured that each data entry is protected by digital signatures from two or more members in the multiple-entity root certificate data block chain; otherwise a compromise of a member can alter the root certificate data.

In some cases, a multiple-entity root certificate data block chain allows a hierarchical structure, where there is freedom in the structure of the sub-level. For example, the level below the multiple-entity root certificate data block chain can be another chain of blocks rather than a PKI subsystem, or it may be a mixture of them. This system allows for a mixture of layers of PKI subsystems and chain of blocks. In some cases, a multiple-entity root certificate data block chain can be deployed without a subsystem. For example, the system may be completely flat, where members in the root CA consortium are end entities rather than CAs.

As shown in FIG. 5C, the example action data block 530 includes a hash of an existing block in the block chain. In this example, the action type identifier and the associated information fields are combined (e.g., concatenated) with the hash of the previous block of the block chain to form the action data block 530.

At 512, the verification entity 504 receives digital signatures of the members of the root CA consortium 502. Digital signatures may be generated on an action block data entry, the entire action data block, or both. The digital signature can be generated using the corresponding member's private key. In some implementations, the digital signature is generated by a digital signature algorithm operating on inputs that include a private key of the signing entity and a message to be signed (e.g., the action data block 530 as shown in FIG. 5C). The digital signature may be generated according to any suitable digital signature algorithm (e.g., RSA, DSA, ECDSA, lattice-based digital signature algorithms, hash-based digital signature algorithms, multivariate signature algorithms, etc.).

At 514, the verification entity 504 generates an action block. The received digital signatures from the members (or the subset of members) can be combined and appended to the action data block to form the action block (the new block for the block chain). FIG. 5D is a diagram of an example action block 540 created by a verification entity based on the action data block 530 in FIG. 5C. In the example shown in FIG. 5D, the action block 540 includes the digital signatures of the members 502 ("Signature_M_1", "Signature_M_2" . . . "Signature_M_n"), appended to the action data block 530 (which includes the action type identifier and the associated information fields and the hash of a prior block). In some cases, the minimum number of required signatures on a block depends on a particular network's level of trust in its members.

At 516, the verification entity 504 publishes the action block to the members of the root CA consortium 502. In some cases, after the action block is created, a data block chain comprising the action block is provided for use, by one or more end entities, as a root certificate data block chain in a cryptography system. In some implementations, the action block may be stored by the members, the end entities or both.

Some of the operations described in this specification can be implemented as operations performed by a computer system or a data processing apparatus executing computer-readable instructions, e.g., a computer program.

Figure 6:
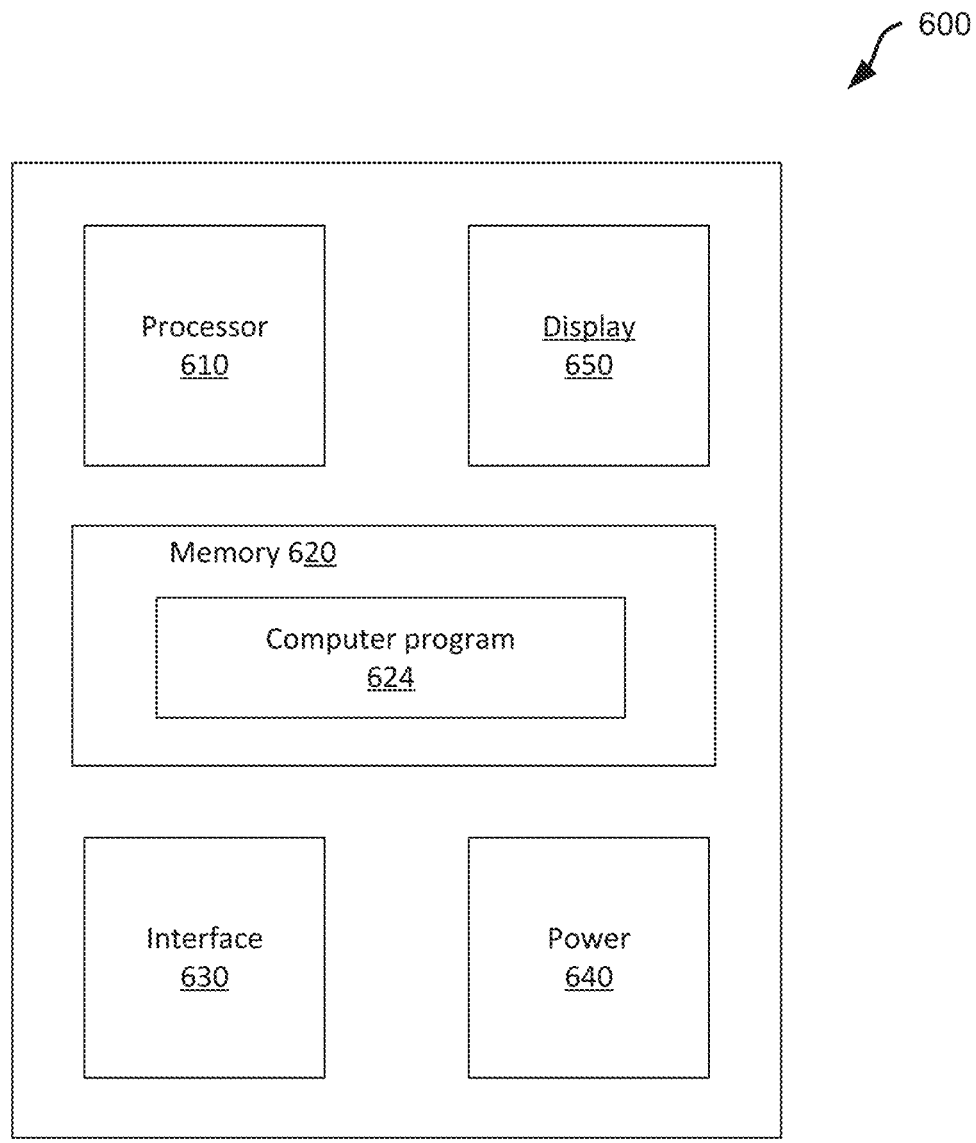
FIG. 6 is a block diagram of an example computer system.

FIG. 6 is a block diagram showing an example of a computer system 600 that includes a data processing apparatus and one or more computer-readable storage devices. The term "data-processing apparatus" encompasses all kinds of apparatus, devices, nodes, and machines for processing data, including by way of example a programmable processor, a computer, a system on a chip, or multiple ones, or combinations, of the foregoing, e.g. processor 610. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code), e.g. computer program 624, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors, e.g. processor 610, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both, e.g. memory 620. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

The example power unit 640 provides power to the other components of the computer system 600. For example, the other components may operate based on electrical power provided by the power unit 640 through a voltage bus or other connection. In some implementations, the power unit 640 includes a battery or a battery system, for example, a rechargeable battery. In some implementations, the power unit 640 includes an adapter (e.g., an AC adapter) that receives an external power signal (from an external source) and coverts the external power signal to an internal power signal conditioned for a component of the computer system 600. The power unit 640 may include other components or operate in another manner.

To provide for interaction with a user, operations can be implemented on a computer having a display device, e.g. display 650, (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The computer system 600 may include a single computing device, or multiple computers that operate in proximity or generally remote from each other and typically interact through a communication network, e.g. via interface 630. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

The example interface 630 may provide communication with other systems or devices. In some cases, the interface 630 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 630 includes a wired communication interface (e.g., USB, Ethernet) that can be connected to one or more input/output devices, such as, for example, a keyboard, a pointing device, a scanner, or a networking device such as a switch or router, for example, through a network adapter.

In a general aspect, a multiple-entity root certificate data block chain is generated or modified, and provided for use by end entities in a cryptography system.

In a first aspect, a genesis data block (e.g., 340 in the example shown in FIG. 3C) is generated by a verification entity (e.g., verification entity 304 as shown in FIG. 3A). The genesis data block includes genesis block data entries representing respective member entities (e.g., founding members 302-1, . . . , 302-$n$ as shown in FIG. 3A) of a root CA consortium. Each genesis block data entry includes an identifier of the member entity represented by the genesis block data entry; a public key of the member entity represented by the genesis block data entry. The genesis data block entries are received from the respective member entities by the verification entity. A first set of digital signatures associated with the genesis data block data entries are then verified (e.g., at 312 as shown in FIG. 3A). A genesis block is generated by the verification entity for the root CA consortium based on the genesis data block. Generating the genesis block includes receiving a second set of digital signatures from the respective member entities based on the genesis data block (e.g., at 318 as shown in FIG. 3A) and appending the second set of digital signatures to the genesis data block (e.g., 350 as shown in FIG. 3D). A block chain that includes the genesis block is provided for use by one or more end entities as a root certificate data block chain in a cryptography system.

Implementations of the first aspect may include one or more of the following features. Each of the member entities has a private key which corresponds to the public key in the genesis block data entry. The private key of each of the member entities is not accessible by any other members or the verification entity. The genesis block data entries and the first set of signatures from the respective member entities are received by the verification entity in parallel. Each digital signature in the first set of digital signatures is generated by a respective one of the member entities based on the identifier of the member entity and the public key of the member entity. Generating the genesis data block may further include verifying the first set of digital signatures of the member entities. The second set of digital signatures from the respective member entities are received by the verification entity in parallel.

In a second aspect, a computing system includes one or more processors and a computer-readable medium storing instructions that are operable when executed by the one or more processors to perform one or more operations of the first aspect.

In a third aspect, a non-transitory computer-readable medium storing instructions that are operable when executed by data processing apparatus to perform operations of the first aspect.

In a fourth aspect, an action data block is obtained by a verification entity. The action data block is delivered to member entities of a root CA consortium. An action block (e.g, 450 as shown in FIG. 4D) is generated by the verification entity for the root CA consortium based on the action data block and the signatures from members. Generating the action block includes receiving a set of digital signatures from the respective member entities (e.g., at 418 as shown in FIG. 4A) and appending the set of digital signatures to the action data block (e.g., as shown in FIG. 4D). Each of the digital signatures in the set is generated based on the action data block by a respective member entity (e.g., Signature_M_1, Signature_M_2, . . . , Signature_M_n). A block chain that includes the action block is provided for use, by one or more end entities, as a root certificate data block chain in a cryptography system (e.g., as an updated root certificate data block chain).

Implementations of the fourth aspect may include one or more of the following features. In some cases, the action data block entry is received by the verification entity from a requesting entity (e.g., in the examples shown in FIGS. 4A-4D), and the action data block entry includes an identifier of the requesting entity (e.g., ID_Req_Entity) and a public key of the requesting entity (e.g., Public_key_Req_Entity). A digital signature of the requesting entity (e.g., Signature_Req_Entity) is also received in association with the action data block entry, and the verification entity generates the action data block after verifying the digital signature of the requester. Generating the action data block may include determining a hash of a previous block in the block chain and appending the hash to the action block data entry. The requesting entity has a private key which corresponds to the public key in the action block data entry. The private key of the requesting entity is not accessible by any members or the verification entity. The action block data entry includes an action type identifier.

Implementations of the fourth aspect may include one or more of the following features. In some cases, the action data block entry is not associated with a specific requesting entity (e.g., in the examples shown in FIGS. 5A-5D). In such cases, the action data block entry does not include an identifier of a requesting entity or a public key of a requesting entity, and a digital signature of a requesting entity does not need to be verified by the verification entity.

In a fifth aspect, a computing system includes one or more processors and a computer-readable medium storing instructions that are operable when executed by the one or more processors to perform one or more operations of the fourth aspect.

In a sixth aspect, a non-transitory computer-readable medium storing instructions that are operable when executed by data processing apparatus to perform operations of the fourth aspect.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method performed by a verification entity comprising:
   receiving genesis block data entries from respective member entities of a root certificate authority consortium, each genesis block data entry comprising an identifier of the respective member entity and a public key of the respective member entity;
   verifying a first set of digital signatures associated with the respective genesis block data entries, each digital signature in the first set associated with a respective one of the genesis data block entries;
   generating a genesis data block comprising the genesis block data entries of the member entities;
   in response to sending the genesis data block to the member entities, receiving a second set of digital signatures from the respective member entities, each digital signature in the second set being generated by a respective member entity based on the genesis data block;
   generating a genesis block based on the genesis data block, wherein generating the genesis block comprises appending the second set of digital signatures to the genesis data block; and
   providing a data block chain comprising the genesis block for use, by one or more end entities, as a root certificate data block chain in a cryptography system.

2. The method of claim 1, wherein each of the member entities has a private key corresponding to the public key in one of the genesis block data entries, and the private key of each of the member entities is not accessible by the verification entity.

3. The method of claim 1, wherein the genesis block data entries from the respective member entities are received by the verification entity in parallel.

4. The method of claim 1, wherein the second set of digital signatures from the respective member entities are received by the verification entity in parallel.

5. The method of claim 1, further comprising, prior to generating the genesis block, verifying the second set of digital signatures of the member entities.

6. The method of claim 1, wherein the first set of digital signatures are received by the verification entity with the respective genesis block data entries, and each digital signature in the first set is generated by a respective one of the member entities based on the identifier of the member entity and a private key of the member entity.

7. The method of claim 1, further comprising adding an action block to the data block chain, wherein adding the action block comprises constructing an action data block, and constructing the action data block comprises:
   determining a hash of the genesis block; and
   appending the hash to an action block data entry.

8. A computer system comprising:
   one or more processors; and
   memory storing instructions that, when executed, cause the one or more processors to perform operations comprising:
      receiving genesis block data entries from respective member entities of a root certificate authority consortium, each genesis block data entry comprising an identifier of the respective member entity and a public key of the respective member entity;
      verifying a first set of digital signatures associated with the respective genesis block data entries, each digital signature in the first set associated with a respective one of the genesis data block entries;
      generating a genesis data block comprising the genesis block data entries;
      in response to sending the genesis data block to the member entities, receiving a second set of digital signatures from the respective member entities, each digital signature in the second set being generated by a respective member entity based on the genesis data block;
      generating a genesis block based on the genesis data block, wherein generating the genesis block comprises appending the second set of digital signatures to the genesis data block; and
      providing a block chain comprising the genesis block for use, by one or more end entities, as a root certificate data block chain in a cryptography system.

9. The computer system of claim 8, wherein each of the member entities has a private key corresponding to the public key in one of the genesis block data entries, and the private key of each of the member entities is not accessible by the verification entity.

10. The computer system of claim 8, wherein the genesis block data entries from the respective member entities are received by the verification entity in parallel.

11. The computer system of claim 8, wherein the second set of digital signatures from the respective member entities are received by the verification entity in parallel.

12. The computer system of claim 8, wherein the operations further comprise, prior to generating the genesis block, verifying the second set of digital signatures of the member entities.

13. The computer system of claim 8, wherein the first set of digital signatures are received by the verification entity with the respective genesis block data entries, and each digital signature in the first set is generated by a respective one of the member entities based on the identifier of the member entity and a private key of the member entity.

14. The computer system of claim 8, wherein the operations further comprise adding an action block to the data block chain, wherein adding the action block comprises constructing an action data block, and constructing the action data block comprises:
   determining a hash of the genesis block; and
   appending the hash to an action block data entry.

15. A method performed by a verification entity, comprising:
- generating an action data block comprising an action block data entry;
- associating the action data block with an existing block of a block chain, wherein associating the action data block with the existing block comprises generating a hash based on the existing block and including the hash in the action data block;
- sending the action data block to member entities of a root certificate authority consortium;
- in response to sending the action data block to the member entities, receiving a set of digital signatures from the respective member entities, each digital signature in the set being generated by a respective member entity based on the action data block;
- generating an action block based on the action data block, wherein generating the action block comprises appending, to the action data block, the set of digital signatures from the member entities; and
- providing the block chain comprising the action block for use, by one or more end entities, as a root certificate data block chain in a cryptography system.

16. The method of claim 15, wherein the action block data entry is received from a requesting entity, and the method comprises verifying a digital signature of the requesting entity.

17. The method of claim 16, wherein the requesting entity has a private key corresponding to a public key in the action block data entry, and the private key of the requesting entity is not accessible by the verification entity.

18. The method of claim 15, wherein the action block data entry comprises an action type identifier identifying an action.

19. The method of claim 18, wherein the action comprises adding a new member to the root certificate authority consortium, and the action block data entry comprises an identifier of the new member, a public key of the new member and a digital signature of the new member.

20. The method of claim 18, wherein the action comprises at least one of:
- removing a member from the root certificate authority consortium;
- updating a public key of a member of the root certificate authority consortium;
- revoking a public key of a member of the root certificate authority consortium;
- replacing a public key of a member of the root certificate authority consortium;
- adding an additional public key of a member of the root certificate authority consortium;
- canceling a public key of a member of the root certificate authority consortium;
- timestamping a valid state of the chain;
- recording a summary of all currently valid identity information;
- freezing the block; or
- unfreezing the block.

21. A computer system comprising:
- one or more processors; and
- memory storing instructions that, when executed, cause the one or more processors to perform operations comprising:
  - generating an action data block comprising an action block data entry;
  - associating the action data block with an existing block of a block chain, wherein associating the action data block with the existing block comprises generating a hash based on the existing block and including the hash in the action data block;
  - sending the action data block to member entities of a root certificate authority consortium;
  - in response to sending the action data block to the member entities, receiving a set of digital signatures from the respective member entities, each digital signature in the set being generated by a respective member entity based on the action data block;
  - generating an action block based on the action data block, wherein generating the action block comprises appending, to the action data block, the set of digital signatures from the member entities; and
  - providing the block chain comprising the action block for use, by one or more end entities, as a root certificate data block chain in a cryptography system.

22. The computer system of claim 21, the operations comprising:
- receiving the action block data entry from a requesting entity, the action block data entry comprising an identifier of the requesting entity and a public key of the requesting entity;
- verifying a digital signature of the requesting entity before sending the action data block to the member entities.

23. The computer system of claim 22, wherein the requesting entity has a private key corresponding to a public key in the action block data entry, and the private key of the requesting entity is not accessible by the verification entity.

24. The computer system of claim 21, wherein the action block data entry comprises an action type identifier identifying an action.

25. The computer system of claim 24, wherein the action comprises adding a new member to the root certificate authority consortium, and the action block data entry comprises an identifier of the new member, a public key of the new member and a digital signature of the new member.

26. The computer system of claim 24, wherein the action comprises at least one of:
- removing a member from the root certificate authority consortium;
- updating a public key of a member of the root certificate authority consortium;
- revoking a public key of a member of the root certificate authority consortium;
- replacing a public key of a member of the root certificate authority consortium;
- adding an additional public key of a member of the root certificate authority consortium;
- canceling a public key of a member of the root certificate authority consortium;
- timestamping a valid state of the chain;
- recording a summary of all currently valid identity information;
- freezing the block; or
- unfreezing the block.

* * * * *